United States Patent [19]

Sulc et al.

[11] Patent Number: 5,270,415

[45] Date of Patent: Dec. 14, 1993

[54] BALANCED CHARGE POLYMER AND HYDROPHILIC CONTACT LENS MANUFACTURED THEREFROM

[75] Inventors: Jiri Sulc, Centerport; Zuzana Krcova, East Northport, both of N.Y.; Patrick Chen, Edison; Qi-Bin Bao, Livingston, both of N.J.

[73] Assignees: Allergan Inc., Irvine, Calif.; Ceskoslovenska akademie ved, Prague, Czechoslovakia

[21] Appl. No.: 632,467

[22] Filed: Dec. 21, 1990

[51] Int. Cl.$^5$ ............................................. C08F 26/06
[52] U.S. Cl. .................................... 526/265; 526/278; 526/287; 526/288; 526/310; 526/312
[58] Field of Search ............... 526/265, 278, 287, 288, 526/310, 312

[56] References Cited

U.S. PATENT DOCUMENTS

| | | | |
|---|---|---|---|
| 4,251,651 | 2/1981 | Kawakami et al. | 526/204 |
| 4,666,964 | 5/1987 | Hunter et al. | 524/106 |
| 5,075,399 | 12/1991 | Ahmed et al. | 526/287 |

OTHER PUBLICATIONS

Written Opinion by International Preliminary Examining Authority in PCT Appln. No. PCT/US91/09625.

*Primary Examiner*—Paul R. Michl
*Assistant Examiner*—Edward Cain
*Attorney, Agent, or Firm*—Dilworth & Barrese

[57] ABSTRACT

A water swellable crosslinked polymer of essentially balanced charge is obtained by polymerizing a polymer-forming composition comprising a cationic-anionic pair of ethylenically unsaturated monomers and a nonionic ethylenically unsaturated hydrophilic and/or hydrophobic monomer. Contact lenses formed from the polymer exhibit little if any tendency to attract soils, e.g., proteinaceous debris, to their surfaces.

24 Claims, No Drawings

BALANCED CHARGE POLYMER AND HYDROPHILIC CONTACT LENS MANUFACTURED THEREFROM

BACKGROUND OF THE INVENTION

This invention relates to a polymer of essentially balanced charge which is obtained from the polymerization of a cationic-anionic monomer pair and a neutral comonomer and to a hydrophilic contact lens fabricated from the polymer.

Hydrophilic contact lenses are generally formed from covalently crosslinked polymers which are based on hydrophilic derivatives of acrylic or methacrylic acid, e.g., their hydrophilic esters or amides, hydrophilic vinylic polymers such as vinylpyrrolidone, and the like. In their hydrated state, these polymers are referred to as hydrogels, coherent three-dimensional polymer structures or net-works which are capable of absorbing large quantities of water without dissolving and of transporting oxygen. In addition to the hydrophilic monomer(s), the preparation of hydrogels used in the manufacture of contact lenses also utilizes minor amounts of less hydrophilic, and even hydrophobic, monomer(s) to confer mechanical strength and other useful properties.

One of the troublesome aspects of known types of hydrogel contact lenses lies in their tendency to accumulate various soils contained in tears, e.g., proteins, lipids, mucoids, etc., on their surfaces. The explanation for this tendency is not all that certain but is believed to be due to the interaction of the charged groups present on the soil components and the charge associated with the hydrogel. For instance, it is known that lysozyme, an enzyme present in tears, possesses a net positive charge and forms complexes with polymers such as the known types of hydrogels which possess a net negative charge This interaction of hydrogel polymer surface and soil represents a significant disadvantage for contact lenses manufactured therefrom.

In an effort to counteract this soil accumulation tendency, U.S. Pat. No. 4,569,858 proposes two methods for treating a lens manufactured from an unhydrated polymer having reactive groups, e.g., hydroxyl and/or acid groups, on its surface with a compound which reacts with such groups to provide a soil deposition-resistance hydrophobic coating, hydrophilic coating or charged surface. In the first of the two methods, the surface of the unhydrated lens is pretreated with a dilute solution of a strong organic base in a nonswelling solvent, e.g., potassium tert-butoxide in ether, to convert surface hydroxyl groups to alkoxide groups followed by reacting alkoxide and carboxylate groups with an alkylating, acylating or sulfonating agent to provide a hydrophobic surface. In the second method, the surface hydroxyl and/or acid groups are directly reacted with a reagent such as a diazoalkane to provide a soil deposition-resistant surface.

In yet another approach to imparting soil deposition-resistance to a hydrogel contact lens, U.S. Pat. No. 4,650,843 discloses forming the lens from a monomeric composition containing 50-95 weight percent of a monomethacrylate of an alkylene glycol, 5-35 weight percent of at least one fluorine-containing monomer selected from the group consisting of trifluoroethyl methacrylate, hexafluorisopropyl methacrylate, pentafluoro-n-propyl methacrylate and pentafluoro-n-butyl methacrylate, and less than 40 weight percent of one or more compounds selected from the group consisting of an unsaturated carboxylic acid having one or more carboxyl groups in the molecule, a monomethacrylate of a polyhydric alcohol having three or more hydroxyl groups, and an alkyl methacrylate.

U.S. Pat. No. 4,163,609 describes a contact lens material, the surface of which is self-cleaning of organic debris, by changing the surface charge from a natural anionic positive charge which attracts debris to a cationic negative charge which repels debris.

SUMMARY OF THE INVENTION

It is a principal object of the invention to provide a polymer, suitable for the fabrication of a contact lens, the surface of which possesses a substantially balanced charge, and as such exhibits little if any tendency to attract soils thereto.

It is a particular object of the invention to provide such a balanced charge polymer by the polymerization of a cationic-anionic monomer pair, e.g., an acidic monomer such as acrylic acid and/or methacrylic acid and a basic monomer such as dieth methacrylate, vinylamine, aminostyrene and/or vinylpyridine, and a nonionic comonomer, e.g., a hydrophilic comonomer such as hydroxyethyl methacrylate (HEMA), hydroxypropyl methacrylate, vinylpyrrolidone, glycerylmethacrylate, acrylamide etc., and/or a hydrophobic comonomer such as silicone-acrylate, silicone-alkylacrylate, siliconemethacrylate, fluoromethacrylate, fluorosilicomethacrylate, methylmethacrylate, etc.

It is another particular object of the invention to provide a hydrophilic contact lens which has been manufactured from the foregoing balanced charge polymer.

In keeping with these and other objects of the invention, a polymer of essentially balanced charge is provided which comprises the polymerizate derived from the polymerization of a major amount of at least one cationic-anionic pair of ethylenically unsaturated monomers and at least one nonionic ethylenically unsaturated monomer.

A hydrophilic contact lens fabricated from the balanced charge polymer of this invention exhibits a significantly reduced tendency to accumulate proteinaceous materials, cell fragments and other soilants upon its surface, a highly advantageous property compared with contact lenses manufactured from the hydrogels exhibiting some net surface charge.

DESCRIPTION OF THE PREFERRED EMBODIMENTS

The cationic-anionic monomer pair employed in the polymerization of the balanced charge polymer of this invention is made up of substantially equimolar amounts of an ethylenically unsaturated cationic monomer, i.e., one possessing one or more weakly or strongly acidic groups, and an ethylenically unsaturated anionic monomer, i.e., one possessing one or more weakly or strongly basic groups, the positive and negative charges of the monomers being substantially balanced in the pair. Strong acids and weak acids can be regarded as those having pKa values of less than about 2 and from about 2 to about 7, respectively, and strong bases and weak bases can be regarded as those having pKa values of greater than about 11 and from about 7 to about 11, respectively.

Suitable cationic monomers include carboxylic acids such as acrylic acid, methacrylic acid, itaconic acid, maleic acid, 2-vinylpropionic acid and 4-vinylpropionic acid and sulfonic acids such as methacyloyloxypropyl-sulfonic acid, vinylsulfonic acid and p-styrenesulfonic acid. Suitable anionic monomers include the primary, secondary and tertiary amines such as aminoethylmethacrylate, methylaminoethylmethacrylate, N,N-dimethylaminoethyl-methacrylate, N,N-diethanolaminoethylmethacrylate, N,N-dimethoxyethylamino-ethylmethacrylate, vinyl amine, aminostyrene, 2-vinyl pyridine, 4-vinyl pyridine, morpholinomethacrylate and N-(2-vinyloxyethyl) piperidine and quaternary ammonium compounds such as 2-trimethylammoniumethyl methacrylic hydroxide, 2-trimethylammoniumacrylic hydroxide, 2-trimethylammoniummethyl methacrylic chloride, 2-trimethylammoniummethylacrylic chloride, 2-methacryloyloxyethyltrimethylammonium methyl sulfate and 2 hydroxy-3 methacryloxyloxypropyltrimethylammonium chloride.

Where the polymer is intended to be used for manufacturing a contact lens, it is preferred that the anionic-cationic monomer pair be either a conjugate of an ethylenically unsaturated weak acid and an ethylenically unsaturated weak base or an ethylenically unsaturated strong acid and ethylenically unsaturated strong base. Where it is not possible to form these conjugate monomer pairs by direct reaction of the acid monomer with the base monomer, the conjugates can usually be prepared from the salts of the acids, e.g., the silver and barium salts, and the halides of the bases, e.g., the chlorides, bromides and iodides, by means of the disproportionation reaction.

While cationic-anionic monomer pairs based on conjugates of a strong acid and a weak base or conjugates of a weak acid and a strong base can be used, the dimensional stability of the resulting hydrogel may be more sensitive to changes in Ph than might be desirable for some applications, particularly, contact lenses. However, for applications where dimensional stability is not important, e.g., drug delivery compositions, such monomer pairs are entirely suitable.

Included within the expression "cationic-anionic monomer pair" or its equivalent "conjugate monomer pair" as used herein are ethylenically unsaturated internal salts containing positive and negative charges substantially in balance with each other. Examples of these internal monomeric salts which can be used herein as the cationic-anionic monomer pair are N-(3-sulfopropyl)-methacroyloxyethyl-N,N-dimethylammonium-betain (SPE), N-(3-sulfopropyl)-N-methacrylamidopropyl-N,N-dimethylammonium-betain (SPP), 1-(3-sulfopropyl)-2-vinyl-pyridinium-betain (SPV), N-methacryloyloxyethyl-N,N-dimethyl-N,2-ethylcarboxybetain, N-(3-carboxypropyl)-N-methylaminoethylmethacrylate, N-(3-carboxypropyl)-N-methylaminomethacryloyloxyethyl-dimethylammonium-betain (CPE), N-(3-carboxypropyl) aminoethylmethacrylate, 2-(methacryloyloxy)ethyl-2-(trimethylammonium) ethylphosphate, etc.

Following its preparation, the cationic-anionic monomer pair is combined with at least one ethylenically unsaturated nonionic monomer which can be hydrophilic, e.g., 2-hydroxyethyl methacrylate (HEMA), hydroxypropylmethacrylate, vinylpyrrolidone, glycerylmethacrylate, acrylamide, etc., or hydrophobic, e.g., silicone-acrylate, silicone-alkylacrylate, silicone-alkylmethacrylate, fluoromethacrylate, fluorosilico-methacrylate, etc. The amount of nonionic monomer(s) can vary from about 1 to about 99.5, and preferably from about 50 to about 95, weight percent of the total weight of monomer present in the polymer-forming composition. Where the polymer-forming composition contains only hydrophilic non-ionic monomer(s), the amount of such monomer(s) can vary from about 50 to about 99.5, and preferably from about 65 to about 95, weight percent of the total monomer content. Where the polymer-forming composition contains only hydrophobic non-ionic monomer(s), the amount of such monomers can vary from about 0.5 to about 80, and preferably from about 1 to about 60, weight percent of the total monomer content. Combinations of hydrophilic and hydrophobic monomers over a wide range of weight ratios can be utilized to impart a variety of mechanical and/or water swellability performance characteristics.

The order of addition of the monomer components to the polymer-forming composition is generally not critical. However, it is preferred to combine both components of the cationic-anionic monomer pair before adding any of the other ingredients of the polymerization medium since this will provide better control over the balanced conjugate-forming operation.

The foregoing monomer mixture can also contain a crosslinking monomer containing at least two ethylenic sites. Examples of such crosslinking monomers include ethylene glycol dimethacrylate (EGDMA) and diacrylate, diethyleneglycol dimethacrylate and diacrylate, triethyleneglycol dimethacrylate and diacrylate, 1,3-propanediol dimethacrylate and diacrylate, 2,2-dimethylpropanediol diacrylate, tripropylene glycol dimethacrylate and diacrylate, 1,3-butylene glycol dimethacrylate and diacrylate, divinylbenzene, sorbitol dimethacrylate, bis-acrylamide, etc. In general, the crosslinking monomer can be present at a level of from about 0.01 to about 5, and preferably from about 0.2 to about 2, weight percent of the total weight of monomers present in the polymer-forming mixture In lieu of crosslinking monomer, covalent crosslinking of the non-hydrated polymer of this invention can be achieved by other means, e.g., by heating the polymer prior to hydration, e.g, at 100°-150° C., so that ionic bonds in at least some carboxyl-amine conjugates are converted to aminidic bonds. Crosslinking can also be achieved by irradiating the non-hydrated polymer, e.g., at from 0.1 to 1.0 megarads. As those skilled in the art recognize, whichever of these methods is used the degree of crosslinking must be sufficient to render the polymer water soluble yet water swellable.

Polymerization of the monomer mixture should be carried out in the absence of water. However, the monomer mixture can be diluted with suitable non-aqueous solvents, e.g., glycerine, ethylene glycol, propylene glycol, diacetin, acetic acid, dimethylsulfoxide, dimethylformamide, the cellosolves, etc., to control volume changes during xerogel lens swelling. The monomer mixture including any other ingredients such as crosslinking monomer, peroxide initiator, etc., can be polymerized to provide the balanced charge polymer of this invention employing known and conventional techniques. The polymer can be formed in situ in a suitable mold via the spin casting procedure to provide a hydrophilic contact lens. Suitable spin casting apparatus and techniques are disclosed, inter alia, in U.S. Pat. Nos. 3,660,545, 4,468,184, 4,516,924, 4,517,138, 4,517,139, 4,517,140 and 4,680,149, the contents of which are incorporated by reference herein. The polymer can also be formed in situ in a two-piece lens mold to provide the desired lens shape. Alternatively, a contact lens can be obtained by lathing a lens blank fabricated from the balanced charge polymer to the appropriate configuration.

In addition to contact lenses, the balanced charge polymer of this invention can be used to prepare implantable prostheses, e.g., intra-corneal implants, intra-ocular lenses, etc., drug delivery systems, and the like.

The following examples are illustrative of the balanced charge polymer of this invention and contact lenses fabricated therefrom.

EXAMPLE 1

This example compares the surface soiling characteristics of two contact lenses, Lenses A and B, prepared by molding in a two-piece plastic lens mold a polymer obtained in accordance with this invention (Lens A) and a known polymer (Lens B).

The polymer-forming compositions were formulated as follows:

| Component | Weight % |
| --- | --- |
| Lens A | |
| N,N-Dimethylaminoethyl methacrylate | 5.678 |
| Methacrylic acid (MAA) | 2.822 |
| 2-Hydroxyethyl methacrylate (HEMA) | 76.075 |
| Ethylene glycol dimethacrylate (EGDMA) | 0.425 |
| Ethylene glycol | 15.0 |
| Lens B | |
| MAA | 1.5 |
| HEMA | 83.0 |
| EGDMA | 0.5 |
| Glycerine | 15 |

To each of these compositions was added 0.5 weight percent of azobisdimethylvaleronitrile initiator. A quantity of each polymer-forming composition was placed in a two-piece plastic lens mold where polymerization was carried out under nitrogen at 80° C. for 5 hours to provide the contact lens which was then hydrated in isotonic saline solution. Lenses A and B both had a 55 weight percent water content.

The 24 hour assay procedure whereby the hydrated lenses were measured for their tendency to attract protein, specifically lysozyme, to their surfaces was as follows:

Each lens was incubated at 35° C. in a Ph 7.4 buffered isotonic saline solution containing 1.2 mg lysozyme/ml. After 24 hours of incubation, the lenses were rinsed with buffered saline and their ultraviolet absorbances were measured spectrophotometrically. Protein deposition was calculated using an extinction coefficient of 2.38 cm$^3$/mg at 280 nm.

In addition to the foregoing protein deposition assay, Lenses A and B were compared for pH sensitivity, tensile strength (g/mm$^2$) and ionic charge sensitivity. The results of all three testing procedures were as follows:

| Property | Lens A | Lens B |
| --- | --- | --- |
| Retention of Lysozyme on the Lens Surface | 0.03 mg/lens (estimated) | 0.33 mg/lens |
| pH Sensitivity | Not sensitive to pH 3.5–8.5; lens expounds 6% at pH 9 and expands 3% at pH 3.5. | Sensitive to different levels of pH; lens shrinks 10% at pH 4. |
| Tensile Strength (g/mm$^2$) | 70 | 80 |
| Ionic charge sensitivity | Not Sensitive; water content changes 2% between saline and deionized water | Very sensitive; water content changes 15% between saline and deionized water |

In addition to the dramatically reduced retention of lysozyme on its surfaces, Lens A exhibited greater biocompatibility, higher water affinity, reduced dehydration and greater wearer comfort than Lens B.

EXAMPLE 2

90 Weight parts of HEMA containing 0.4 weight percent of EGDMA was mixed with 10 weight parts of monomer charge-conjugate prepared in the following manner:

1 Mole of methacrylic acid was slowly added to 1 mole of dimethylaminoethyl methacrylate under intensive cooling and stirring so that the temperature would not exceed 30° C. The conjugate was recrystallized from methanol solution. 0.1 Weight percent of azobisisobutyronitrile initiator was added to the monomer mixture which was then polymerized at 60° C. under nitrogen in a two-piece plastic mold. After 2 hours the mold was opened and the finished lens hydrated in isotonic saline solution. The liquid content of the lens was 55 weight percent.

EXAMPLE 3

The azobisisobutyronitrile initiator in the polymer-forming mixture of Example 2 was replaced with benzoin methylether and the mixture was polymerized by spincasting with UV irradiation (at 365 nm; 60 W Hg lamp at 5.0 cm distance for 20 minutes). The resulting lens had similar properties as the lens of Example 2.

EXAMPLE 4

50 Weight parts of ethyltriglycolmethacrylate, 50 weight parts of the monomer conjugate of Example 2 and 2 weight parts of EGDMA were mixed. Polymerization of the mixture was initiated with 0.5% of azobisdimethylvaleronitrile in a two-piece plastic mold at 60° C. for 3 hours and at 80° C. for 2 hours. The resulting lens contained 71 weight percent of water at equilibrium hydration in saline.

EXAMPLE 5

50 Grams of ethoxyethyl methacrylate were mixed with 50 grams of the monomer conjugate of Example 2 and 0.8 grams of EGDMA. The mixture was initiated by 0.08% of azobisisobutyronitrile and polymerized for 24 hours at 60° C. in a sealed glass ampule. After cooling, the ampule was broken and the resulting polymer block was lathed and polished into a lens. The resulting lens contained 80 weight percent water after complete hydration in isotonic saline solution.

EXAMPLE 6

A mixture of 20 weight parts of 3-methacryloxypropyltris(trimethylsiloxy)silane, 1 weight part of EGDMA and 80 weight parts of the monomer conjugate of Example 2 was diluted with 10% of Cellosolve. 0.1 Weight percent of azobisisobutyronitrile was added and the mixture was polymerized in a plastic two-piece plastic mold at 80° C. for 3 hours. The resulting lens contained 60 weight percent water after complete hydration in saline, an oxygen permeability of $DK = 35 - 40 \times 10^{-11}$ (cm$^2$/sec)(ml O$_2$/[ml×mmHg]) and a tensile strength in the hydrated state of 120g/mm$^2$.

EXAMPLE 7

30 Weight parts of n-hexyl methacrylate, 0.5 weight parts of EGDMA and 70 weight parts of the monomer conjugate of Example 2 were mixed. The mixture was initiated by 0.1 weight percent of azobisisobutyronitrile and polymerized 4 hours at 60° C. in a two-piece plastic mold. The resulting lens contained 70 weight percent water after complete hydration in saline and exhibited a tensile strength in the hydrated state of 110g/m$^2$.

EXAMPLE 8

30 Grams of ethylmethacrylate were mixed with 7 grams of the monomer conjugate of Example 2 and 0.5 grams of EGDMA. The mixture was initiated by 0.1 grams azobisisobutyronitrile and polymerized in a two-piece plastic mold at 80° C. for 3 hours. The resulting lens contained 78 weight percent water after complete hydration in saline and a tensile strength of 100 g/mm$^2$.

EXAMPLE 9

80 Weight percent parts of hydroxypropyl methacrylate, 20 weight parts of the monomer conjugated from Example 2 and 0.5 parts EGDMA were mixed. 0.1 Weight percent azobisisobutyronitrile two-piece plastic mold was added and the mixture was polymerized at 75° C. for 4 hours. The resulting lens contained 57 weight percent water after complete hydration in saline, a tensile strength of 80 g/mm$^2$ and an elongation in the hydrated state of 440%.

EXAMPLE 10

30 Grams of methyl methacrylate were mixed with 70 grams of the monomer conjugate of Example 2 together with 0.5 grams EGDMA. Polymerization was initiated by 0.08% weight percent of azobisisobutyronitrile for 24 hours at 60° C. in a sealed glass ampule. After cooling, the ampule was broken and the resulting polymer block was lathed and polished into a lens. The resulting lens contained 70 weight percent water after complete hydration in isotonic saline.

EXAMPLE 11

3 Weight parts of teriary-butylmethacrylate, 0.05 weight parts of EGDMA and 7 weight parts of the monomer conjugate of Example 2 were mixed. The mixture was initiated with 0.5% azobisdimethylvaleronitrile and polymerized in a two-piece plastic mold at 60° C. for 3 hours. The resulting lens contained 77 weight percent water after hydration in saline and a tensile strength in the hydrated state of 80 g/mm$^2$.

EXAMPLE 12

3 Weight parts of n-butylmethacrylate, 7 weight parts of the monomer conjugate of Example 2 and 0.05 weight parts of EGDMA were mixed. The mixture was initiated with 0.5% azobisdimethylvaleronitrile and polymerized in a two-part plastic mold at 60° C. for 4 hours. The resulting lens contained 70 weight percent water after complete hydration in saline.

EXAMPLE 13

3 Weight parts of tetrafluoropropylmethacrylate, 7 weight parts of the monomer conjugate of Example 2 and 0.05 weight of EGDMA were mixed. Polymerization was initiated with azobisdimethylvaleronitrile in a two-piece plastic mold at 80° C. for 3 hours. The resulting lens contained 70 weight percent water after complete hydration in saline.

EXAMPLE 14

1 Mole of methacrylic acid was slowly added to 1 mole dimethylaminoethylmethacrylamide and cooled below 20° C. 20 weight parts of the resulting conjugate were mixed with 80 weight parts of HEMA and 0.2 weight parts of EGDMA. Polymerization was initiated with 0.5 weight percent of azobisdimethylvaleronitrile in substantially the same manner as in Example 13. The resulting lens contained 69 weight percent water after complete full hydration in isotonic saline.

EXAMPLE 15

10 Weight parts of methacryloyloxypropyl sulfonic acid and methacryloyloxypropyl trimethylammonium base conjugate were dissolved in 90 weight parts of HEMA containing 0.5 weight percent of EGDMA. Polymerization of the mixture was initiated by 0.5 weight percent of azobisdimethylvaleronitrile in substantially the same manner as in Example 13. The resulting lens had 50% of water after complete hydration in isotonic saline solution.

EXAMPLE 16

10.1 Weight parts of SPE were dissolved in 15 weight parts of propyleneglycol and 74.4 weight parts of HEMA containing 0.5 weight percent EGDMA. Polymerization was initiated by 0.2 weight percent benzoinmethylether. A contact lens was manufactured from the polymer-forming mixture by the spincasting method employing photopolymerization. The resulting lens contained 52 weight percent water in isotonic saline solution.

EXAMPLE 17

A conjugate monomer pair was prepared by slowly combining 8.46g t-butylaminoethylmethacrylate (t-BAEMA) in 10g acetone with 4.3g methacrylic acid (MAA) in 10g acetone and thereafter cooling the combined material to below 5° C. The crude t-BAEMA-MAA conjugate pair was separated from the acetone by filtration, dried at ambient temperature under vacuum and recrystallized by dissolving 10g of the conjugate in 15g acetone at 35° C. and placing the solution overnight in a refrigerator.

A contact lens was prepared by combining 1.6g HEMA, 0.4g t-BAEMA-MAA conjugate pair prepared as described, 0.01 azobisdimethylvaleronitrile and 0.35g propylene glycol (solvent), placing the polymer-forming composition in a two-piece plastic lens mold and polymerizing as in Example 1. The resulting contact lens swelled 55 weight percent in isotonic saline solution.

EXAMPLE 18

Following the procedures described in Example 17, a contact lens was prepared from a polymer-forming composition containing 1.7g hydroxypropylmethacrylate, 0.3 g N-methacryloyoxyethyl-N,N-dimethyl-N,2-ethyl carboxybetaine (CPE), 0.01 g EGDMA and 0.01g azobisdimethylvaleronitrile. The resulting contact lens was clear and swelled to 51 weight percent of water in isotonic saline solution.

What is claimed is:

1. A charge balanced, water swellable crosslinked polymer which comprises the polymerizate derived from the copolymerization of at least one cationic-anionic pair of ethylenically unsaturated monomers and at least one nonionic ethylenically unsaturated monomer,
   wherein the cationic-anionic pair if made up of a relatively weak monomeric acid and a relatively weak monomeric base.

2. The polymer of claim 1 wherein the polymerizate is further derived from a crosslinking monomer containing at least two ethylenic sites.

3. The polymer of claim 3 wherein the relatively weak monomeric acid is a carboxylic acid and the relatively weak base is a primary, secondary or tertiary amine.

4. The polymer of claim 4 wherein the carboxylic acid is selected from the group consisting of acrylic acid, methacrylic acid, itaconic and, maleic acid, 2-vinylpropionic acid and 4-vinylpropionic acid and the primary, secondary or tertiary amine is selected from aminoethylmethacrylate, methylaminoethylmethacrylate, N,N-dimethylaminoethylmethacrylate, N,N-diethanolaminoethylmethacrylate, N,N-dimethoxyethylaminoethylmethacrylate, vinyl amine, aminostyrene, 2-vinyl pyridine, 4-vinyl pyridine, morpholinomethacrylate and N-(2-vinyloxyethyl) piperidine.

5. The polymer of claim 1 wherein the cationic-anionic pair is made up of a relatively strong monomeric acid and a relatively strong monomeric base.

6. The polymer of claim 5 wherein the relatively strong monomeric acid is a sulfonic acid and the relatively strong base is a quaternary ammonium compound.

7. A charge balanced, water swellable crosslinked polymer which comprises the polymerizate derived from the copolymerization of at least one cationic-anionic pair of ethylenically unsaturated monomers and at least one nonionic ethylenically unsaturated monomer,
   wherein the cationic-ionic pair if made up of a relatively strong monomeric acid and a relatively strong monomeric base,
   the relatively strong monomeric acid is a sulfonic a id and the relatively strong monomeric base is a quaternary ammonium compound, and
   the sulfonic acid is selected from the group consisting of methacryloyloxypropyl-sulfonic acid, vinylsulfonic acid and p-styrenesulfonic acid and the quaternary ammonium compound is selected from the group consisting of 2-trimethylammonium methyl methacrylic hydroxide, 2-trimethylammoniumacrylic hydroxide, 2-trimethylammonium methyl methacrylic chloride, 2-trimethylammoniumethyl acrylic chloride, and 2-hydroxy-3-methacryloxyloxypropyltrimethyl ammonium chloride.

8. A charge balanced, water swellable crosslinked polymer which comprises the polymerizate derived from the copolymerization of at least one cationic-anionic pair of ethylenically unsaturated monomers and at least one nonionic ethylenically unsaturated monomer,
   wherein the cationic-anionic pair is made up of a relatively strong acid and a relatively weak base.

9. A charge balanced, water swellable crosslinked polymer which comprises the polymerizate derived from the copolymerization of at least one cationic-anionic pair of ethylenically unsaturated monomers and at least one nonionic ethylenically unsaturated monomer,
   wherein the cationic-anionic pair is made up of a relatively weak acid and a relatively strong base.

10. A charge balanced, water swellable crosslinked polymer which comprises the polymerizate derived from the copolymerization of at least one cationic-anionic pair of ethylenically unsaturated monomers and at least one nonionic ethylenically unsaturated monomer.
    wherein the cationic-anionic pair if provided as an internal monomeric salt.

11. The polymer of claim 10 wherein the internal monomeric salt is selected from the group consisting of N-(3-sulfopropyl)-methacroyloxyethyl-N,N-dimethylammonium-betain, N-(3-sulfo-propyl)-N-methacrylamidopropyl-N-dimethylammonium-betain, 1-(3-sulfopropyl)-2-vinyl-pyridinium-betain, N-methacryloyloxyethyl-N,N-dimethyl-N,2-ethyl carboxybetaine (CPE), N-(3-carboxypropyl)-N-methylaminoethylmethacrylate N-(3-carboxypropyl)-N-methylamino-methacryloyloxyethyl-N,N-dimethylammonium betain, N-(3-carboxypropyl) aminoethylmethacrylate and 2-(methacryloyloxy)ethyl-2-(trimethylammonium) ethylphosphate.

12. A charge balanced, water swellable crosslinked polymer which comprises the polymerizate derived from the copolymerization of at least one cationic-anionic pair of ethylenically unsaturated monomers and at least one non-ionic ehtylenically unsaturated monomer,
    wherein the non-ionic monomer is selected from the group consisting of 2-hydroxyethyl methacrylate, hydroxypropylmethacrylate, glycerylmethacrylate, silicon-acrylate, silicone-alkylacrylate, silicone-alkylmethacrylate, fluoromethacrylate, fluorosilico-methacrylate and mixtures thereof.

13. The polymer of claim 12 wherein said nonionic monomer comprises from about 1 to about 99.5 weight percent of total weight of monomer present in a composition forming said polymer.

14. The polymer of claim 13 wherein said nonionic monomer comprises from about 50 to about 95 weight percent of the total monomer weight.

15. The polymer of claim 3 wherein aid nonionic monomer is hydrophilic.

16. The polymer of claim 15 wherein said nonionic monomer comprises from about 50 to about 99.5 weight percent of total weight of monomer present in a composition forming said polymer.

17. The polymer of claim 16 wherein said nonionic monomer comprises from about 65 to about 95 weight percent of the total monomer weight.

18. The polymer of claim 3 wherein said nonionic monomer is hydrophobic.

19. The polymer of claim 18 wherein said nonionic monomer comprises from bout 0.5 to about 80 weight percent of total weight of monomer present in a composition forming said polymer.

20. The polymer of claim 19 wherein said nonionic monomer comprises from bout 1 to about 60 weight percent of the total monomer weight.

21. The polymer of claim 2 wherein said cross-linking monomer is selected from the group consisting of ethylene glycol dimethacrylate, ethylene glycol diacrylate, diethyleneglycol dimethacrylate, diethyleneglycol diacrylate, triethyleneglycol dimethacrylate, triethyleneglycol diacrylate, 1,3-propanediol dimethacrylate, 1,3-propanediol diacrylate, 2,2-dimethylpropanediol diacrylate, tripropylene glycol dimethacrylate, tripropylene glycol diacrylate, 1,3-butylene glycol dimethacrylate, 1,3-butylene glycol diacrylate, divinylbenzene, sorbitol dimethacrylate and bis-acrylamide and mixtures thereof.

22. The polymer of claim 2 wherein said cross-linking monomer comprises from about 0.01 to about 5 weight percent of total weight of monomer present in a mixture forming said polymer.

23. The polymer of claim 22 wherein said cross-linking monomer comprises from about 0.2 to about 2 weight percent of the total monomer weight.

24. The polymer of claim 12 wherein the non-ionic monomer is selected from the group consisting of 2-hydroxyethyl methacrylate, ethyltriglycolmethacrylate, ethoxyethyl methacrylate, 3-methacryloxypropyl-tris (trimethylsiloxy) silane, n-hexyl methacrylate, ethylmethacrylate, hydroxypropyl methacrylate, methyl methacrylate, tertiary butylmethacrylate, n-butylmethacrylate and tetrafluoropropylmethacrylate and mixtures thereof.

* * * * *